US 6,643,735 B2

(12) United States Patent
Rodriguez et al.

(10) Patent No.: US 6,643,735 B2
(45) Date of Patent: Nov. 4, 2003

(54) INTEGRATED RAID SYSTEM WITH THE CAPABILITY OF SELECTING BETWEEN SOFTWARE AND HARDWARE RAID

(75) Inventors: Jorge R. Rodriguez, Cary, NC (US); Darryl Edward Gardner, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 10/006,280

(22) Filed: Dec. 3, 2001

(65) Prior Publication Data

US 2003/0105920 A1 Jun. 5, 2003

(51) Int. Cl.$^7$ ............................................. G06F 12/00
(52) U.S. Cl. .......................... 711/114; 710/5; 710/37; 710/39; 709/105
(58) Field of Search ....................... 711/114; 710/5, 710/18, 37, 39; 709/105

(56) References Cited

U.S. PATENT DOCUMENTS

| | | | |
|---|---|---|---|
| 3,702,006 A | 10/1972 | Page ............................. 444/1 |
| 5,450,609 A | * 9/1995 | Schultz et al. .............. 711/114 |
| 5,488,701 A | 1/1996 | Brady et al. ............. 395/182.04 |
| 5,574,851 A | 11/1996 | Rathunde ................. 395/182.05 |
| 5,657,439 A | 8/1997 | Jones et al. ............. 395/182.05 |
| 5,682,509 A | 10/1997 | Kabenjian ................... 395/309 |
| 5,689,678 A | 11/1997 | Stallmo et al. ............. 395/441 |
| 5,768,623 A | * 6/1998 | Judd et al. ..................... 710/37 |
| 5,848,270 A | * 12/1998 | DeLuca et al. ............. 709/105 |
| 5,870,604 A | 2/1999 | Yamagishi .................. 395/675 |
| 5,937,428 A | 8/1999 | Jantz ........................... 711/114 |
| 5,940,840 A | 8/1999 | Eshel et al. .................. 707/205 |
| 5,950,230 A | 9/1999 | Islam et al. .................. 711/156 |
| 5,960,169 A | 9/1999 | Styczinski ............. 395/182.04 |
| 6,009,478 A | * 12/1999 | Panner et al. ................... 710/5 |
| 6,058,454 A | 5/2000 | Gerlach et al. ............. 711/114 |
| 6,065,085 A | 5/2000 | Odenwald, Jr. et al. ..... 710/129 |
| 6,115,764 A | 9/2000 | Chisholm et al. ........... 710/100 |
| 6,128,762 A | 10/2000 | Jadav et al. ................. 714/766 |
| 6,138,176 A | 10/2000 | McDonald et al. ............ 710/6 |
| 6,173,306 B1 | 1/2001 | Raz et al. .................... 709/102 |
| 6,179,489 B1 | 1/2001 | So et al. ...................... 395/672 |
| 6,185,601 B1 | 2/2001 | Wolff .......................... 709/203 |
| 6,272,662 B1 | 8/2001 | Jadav et al. ................ 714/805 |
| 6,279,138 B1 | 8/2001 | Jadav et al. ................ 714/800 |
| 6,282,619 B1 | 8/2001 | Islam et al. ................. 711/165 |
| 6,282,670 B1 | 8/2001 | Rezaul Islam et al. ......... 714/6 |
| 6,393,415 B1 | * 5/2002 | Getchius et al. ............... 707/2 |
| 6,529,978 B1 | * 3/2003 | Eide et al. ................... 710/104 |
| 6,564,271 B2 | * 5/2003 | Micalizzi ..................... 710/39 |

OTHER PUBLICATIONS

"RAID Arrays," via Internet at http://www.eirespace.com/raid/raid/htr, pp. 1–15.

J. Menon et al. "Algorithms for software and low–cost hardware RAIDs," *IEEE Computer Society Press*, Mar. 5–9, 1995, pp. 411–418.

* cited by examiner

*Primary Examiner*—Donald Sparks
*Assistant Examiner*—Ngoc V Dinh
(74) *Attorney, Agent, or Firm*—Winstead Sechrist & Minick

(57) ABSTRACT

A system, computer program product and method for servicing requests. A server may be configured to receive a stream of requests to access particular logical block addresses in one or more logical drives in a RAID from one or more clients. The server may be coupled to one or more RAID adapters that are coupled to the RAID. The server may comprise a software RAID and each RAID adapter may comprise a hardware RAID. By monitoring the utilization of the processors in the server and in each RAID adapter, all or part of these received requests may subsequently be routed to either the software RAID or the hardware RAID based on which implementation is more desirable to service these requests.

25 Claims, 4 Drawing Sheets

INTEGRATED RAID SYSTEM WITH THE CAPABILITY OF SELECTING BETWEEN SOFTWARE AND HARDWARE RAID

TECHNICAL FIELD

The present invention relates to the field of disk arrays, and more particularly to a Redundant Array of Independent Disks (RAID) system that implements an integrated RAID comprising a software RAID and a hardware RAID.

BACKGROUND INFORMATION

A network server, e.g., file server, database server, web server, may be configured to receive a stream of requests from clients in a network system to read from or write to a particular logical drive in an array of logical drives such as a Redundant Array of Independent Disks (RAID). These requests may form what is commonly referred to as a "workload" for the network server. That is, a workload may refer to the requests that need to be serviced by the network server. The network server may be coupled to the RAID via one or more adapters commonly referred to as RAID adapters. Each RAID adapter may be coupled to one or more logical drives and to the network server.

In RAID systems, data is spread or "striped" across multiple disk logical drives. In many implementations, the data is stored in conjunction with parity information such that any data lost as a result of a single logical drive failure may be automatically reconstructed.

One type of RAID implementation is commonly referred to as "software RAID." Software RAID may refer to the implementation where software on the network server, which may be part of the operating system on the network server, may be used to implement the various RAID control functions. These control functions may include, for example, generating drive specific read/write requests according to a striping algorithm, reconstructing lost data when drive failures occur, generating and checking parity, etc.

Another type of RAID implementation is commonly referred to as "hardware RAID." Hardware RAID may refer to the implementation where an application configured to implement the various RAID control functions as described above may be loaded into Random Access Memory (RAM) in a RAID adapter. In the hardware RAID implementation, the processor in the network server may be configured to interpret and transmit the workload requests to the appropriate RAID adapter so that the appropriate hardware RAID will service the workload request.

In certain environments, hardware RAID has been perceived to be advantageous over software RAID; while in other environments, software RAID has been perceived to be advantageous over hardware RAID. At least in part these environments depend on the type of workload, i.e., the type of requests issued by the clients to the network server. For example, a hardware RAID may be desirable to service a workload that comprises a high percentage of web requests that are user intensive since the hardware RAID may be used to process the workload requests thereby freeing the processor in the network server to service other types of requests. A disadvantage of hardware RAID though is that the processor of the RAID adapter comprising the hardware RAID may service the workload requests at a lower rate than the processor in the network server subsequently creating what is commonly referred to as a "bottleneck." A bottleneck may refer to the phenomena when the RAID adapter cannot service the workload requests at the rate the requests are transmitted from the network server. A solution may in part be to replace the RAID adapter with a more expensive RAID adapter that can process the workload requests at a faster rate, i.e., replace the RAID adapter with a RAID adapter that has a faster execution speed. However, that may add to the cost of the hardware implementation which may already be more expensive to implement than the software RAID implementation. Subsequently, it may be desirable to implement a software RAID instead of a hardware RAID to service a workload that comprises a high percentage of requests that are not user intensive, e.g., file requests to read from or write to one of the disks of the RAID.

It would therefore be desirable to develop an integrated RAID system comprising a software RAID and a hardware RAID where the integrated RAID system selects implementing either the software RAID or the hardware RAID based on which implementation is more desirable to service all or part of the workload requests. By developing an integrated RAID system, load balancing between the processor in the network server and in the RAID adapter may be accomplished thereby eliminating the bottleneck phenomena in the hardware RAID implementation. That is, the processor in the network server and in the RAID adapter may process the workload requests at a substantially similar rate thereby eliminating the bottleneck phenomena in the hardware RAID implementation. Furthermore, because load balancing may be accomplished between the network server and in the RAID adapter, there may be improved scalability. That is, an increase in the workload requests to be processed by the hardware RAID in the RAID adapter may be accomplished without necessarily replacing the RAID adapter with a RAID adapter that has a faster execution speed.

SUMMARY

The problems outlined above may at least in part be solved in some embodiments by an integrated RAID system comprising a software RAID and a hardware RAID that selects implementing either the software RAID or the hardware RAID based on which implementation is more desirable to service all or part of the workload requests.

In one embodiment of the present invention, a method for servicing workload requests by selecting either a software RAID or a hardware RAID to service all or part of the workload requests may comprise the step of a server receiving a stream of requests to read from or write to particular Logical Block Addresses (LBA's) in one or more logical drives in a RAID from one or more clients. A software RAID may refer to the implementation where the server may comprise a memory unit operable for storing software configured to handle RAID control functions. The server may be coupled to one or more RAID adapters that are coupled to the RAID. A hardware RAID may refer to the implementation where an application configured to handle the various RAID control functions may be loaded into Random Access Memory (RAM) in a RAID adapter.

The utilization of the processor, i.e., the percentage of processor cycles utilized to process instructions, may then be monitored in the server. Furthermore, the utilization of the processor, i.e., the percentage of processor cycles utilized to process instructions, may be monitored in each RAID adapter coupled to the server.

A determination may then be made as to whether the processor of the server is fully utilized, i.e., operating at one hundred percent (100%) utilization. If the processor of the server is fully utilized, i.e., operating at one hundred percent (100%) utilization, then a determination may be made as to whether the processor of a RAID adapter is fully utilized, i.e., operating at one hundred percent (100%) utilization. It is noted that the determination may be made as to whether the processor in each RAID adapter coupled to the server is fully utilized, i.e., operating at one hundred percent (100%) utilization.

If the processor of the RAID adapter is not fully utilized, i.e., not operating at one hundred percent (100%) utilization, then those requests in the received stream of requests with logical block addresses that are serviceable by that RAID adapter may be routed to that RAID adapter to be serviced by the hardware RAID in that RAID adapter. Those requests with logical block addresses serviceable by the RAID adapter may be routed to that RAID adapter to be serviced by the hardware RAID since the processor of that RAID adapter has the capacity to execute various RAID control functions and the processor in the server does not have the capacity to execute various RAID control functions.

If the processor of the RAID adapter is fully utilized, i.e., operating at one hundred percent (100%) utilization, then, a first portion of the received stream of requests with LBA's that are serviceable by that RAID adapter may be routed to the server to be serviced by the software RAID and a second portion of the received stream of requests with LBA's that are serviceable by the RAID adapter may be routed to that RAID adapter to be serviced by the hardware RAID. These requests may be serviced by the software RAID and the hardware RAID upon the respective processors having capacity to execute the RAID control functions. The first and second portions may be determined based on a ratio of the execution speeds of the respective processors.

For example, the portion of requests to be routed to the server to be serviced by the software RAID may be determined by the following formula:

$$R_{server} = MIPS_{serer}/(MIPS_{serer} + MIPS_{adapter})$$

where $R_{server}$ may be the fraction of the requests received with LBA's that are serviceable by the RAID adapter that are to be routed to the server to be serviced by the software RAID; where $MIPS_{serer}$ may be the execution speed of the processor the server, i.e., the Millions Instructions Per Second (MIPS) rating for the processor of the server; where $MIPS_{adapter}$ may be the execution speed of the processor of the RAID adapter, i.e., the MIPS rating for the processor of the RAID adapter configured to service the LBA's of these requests.

Similarly, the portion of requests to be routed to the RAID adapter to be serviced by the hardware RAID may be determined by the following formula:

$$R_{adapter} = MIPS_{adapter}/(MIPS_{server} + MIPS_{adapter})$$

where $R_{adapter}$ may be the fraction of the requests received with LBA's that are serviceable by the RAID adapter that are to be routed to the that RAID adapter to be serviced by the hardware RAID; where $MIPS_{serer}$ may be the MIPS rating for the processor of the server; where $MIPS_{adapter}$ may be the MIPS rating for the processor of the RAID adapter configured to service the LBA's of these requests.

If, for example, the MIPS rating for the processor of the server is 40 MIPS and the MIPS rating for the processor of the RAID adapter is 20 MIPS, then two-thirds (⅔) of the requests received with LBA's that are serviceable by the RAID adapter may be routed to the server to be serviced by the software RAID. One-third (⅓)) of the requests received with LBA's that are serviceable by the RAID adapter may subsequently be routed to that RAID adapter to be serviced by the hardware RAID.

The above description described the two cases when the processor of the server is fully utilized. However, if the processor of the server is not fully utilized, i.e., operating at one hundred percent (100%) utilization, then a determination may be made as to whether the processor of the RAID adapter is fully utilized, i.e., operating at one hundred percent (100%) utilization. It is noted that a determination may be made as to whether the processor in each RAID adapter coupled to the server is fully utilized, i.e., operating at one hundred percent (100%) utilization.

If the processor of the RAID adapter is fully utilized, i.e., operating at one hundred percent (100%) utilization, then those requests in the received stream of requests with logical block addresses that are serviceable by that RAID adapter may be routed to the server to be serviced by the software RAID. Those requests with logical block addresses that are serviceable by the RAID adapter may be routed to the server to be serviced by the software RAID since the processor of the server has the capacity to execute various RAID control functions and the processor in the RAID adapter does not have the capacity to execute the various RAID control functions.

If the processor of the RAID adapter is not filly utilized, i.e., not operating at one hundred percent (100%) utilization, then a first portion of the received stream of requests with LBA's that are serviceable by that RAID adapter may be routed to the server to be serviced by the software RAID and a second portion of the received stream of requests with LBA's that are serviceable by that RAID adapter may be routed to that RAID adapter to be serviced by the hardware RAID. The first and second portions may be determined based on a ratio of the execution speeds of the respective processors as described above.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a system, computer program product and method for servicing requests. In one embodiment of the present invention, a server may be configured to receive a stream of requests to access particular logical block addresses in one or more logical drives in a RAID from one or more clients. The server may be coupled to one or more RAID adapters that are coupled to the RAID. Software RAID may refer to the implementation where the server via software may implement the various RAID control functions. Hardware RAID may refer to the implementation where an application configured to implement the various RAID control functions may be loaded into Random Access Memory (RAM) in a RAID adapter. By monitoring the utilization of the processors in the server and in each RAID adapter, all or part of these received requests may subsequently be routed to either the software RAID or the hardware RAID based on which implementation is more desirable to service these requests.

Figure 1:
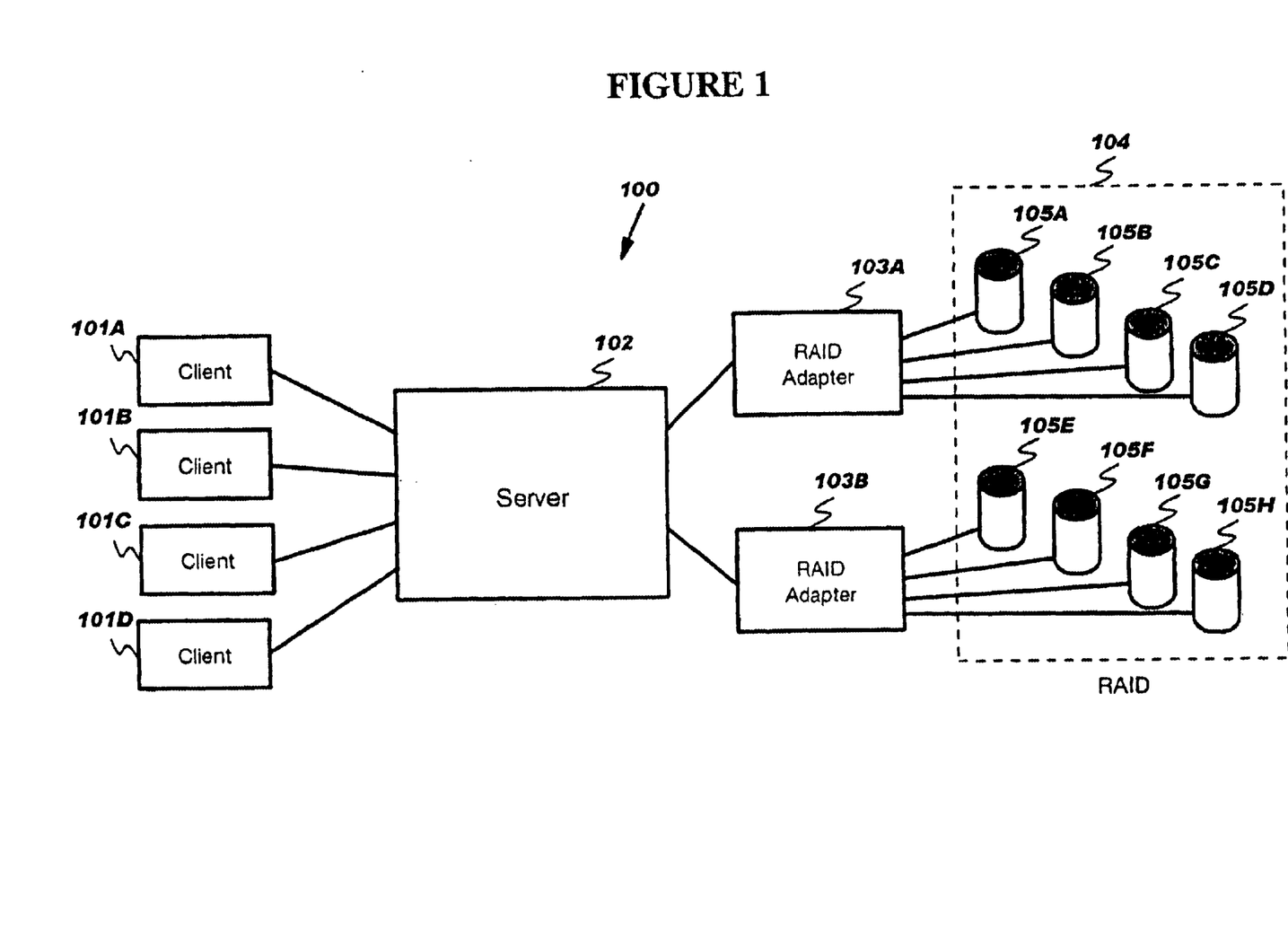
FIG. 1 illustrates an embodiment of a network system configured in accordance with the present invention.

FIG. 1—Network System

FIG. 1 illustrates one embodiment of the present invention of a network system 100. Network system 100 may comprise one or more clients 101A–D coupled to a server 102, e.g., file server, database server, web server. Server 102 may be coupled to an array of logical drives 105A–H that comprise a Redundant Array of Independent Disks (RAID) 104 via one or more RAID adapters 103A–B. Clients 101A–D may collectively or individually be referred to as clients 101 or client 101, respectively. Raid adapters 103A–B may collectively or individually be referred to as RAID adapters 103 or RAID adapter 103, respectively. Logical drives 105A–H may collectively or individually be referred to as logical drives 105 or logical drive 105, respectively. Each client 101 may be configured to issue requests to server 102 to read from or write to a particular Logical Block Address (LBA) in a particular logical drive 105 in RAID 104. Each logical drive 105 may be configured to store information, e.g., instructions, data, within a range of LBA's. Server 102 may be configured to retrieve the requested information, e.g., data, from the requested logical drive 105 via RAID adapter 103. Each RAID adapter 103 may be coupled to one or more logical drives 105. For example, referring to FIG. 1, RAID adapter 103A may be coupled to logical drives 105A–D. RAID adapter 103B may be coupled to logical drives 105E–H. Consequently, RAID adapter 103A may be associated with a range of LBA's that covers the range of LBA's for logical drives 105A–D. Similarly, RAID adapter 103B may be associated with a range of LBA's that covers the range of LBA's for logical drives 105E–H. It is noted that system 100 may comprise any number of clients 101, servers 102, RAID adapters 103 and logical drives 105 and that FIG. 1 is illustrative. For example, system 100 may comprise multiple servers 102 coupled to shared RAID adapters 103 that are coupled to RAID 104. It is further noted that network system 100 may be any type of system such as a file system or a database system and that FIG. 1 is not to be limited in scope to any one particular embodiment.

Figure 2:
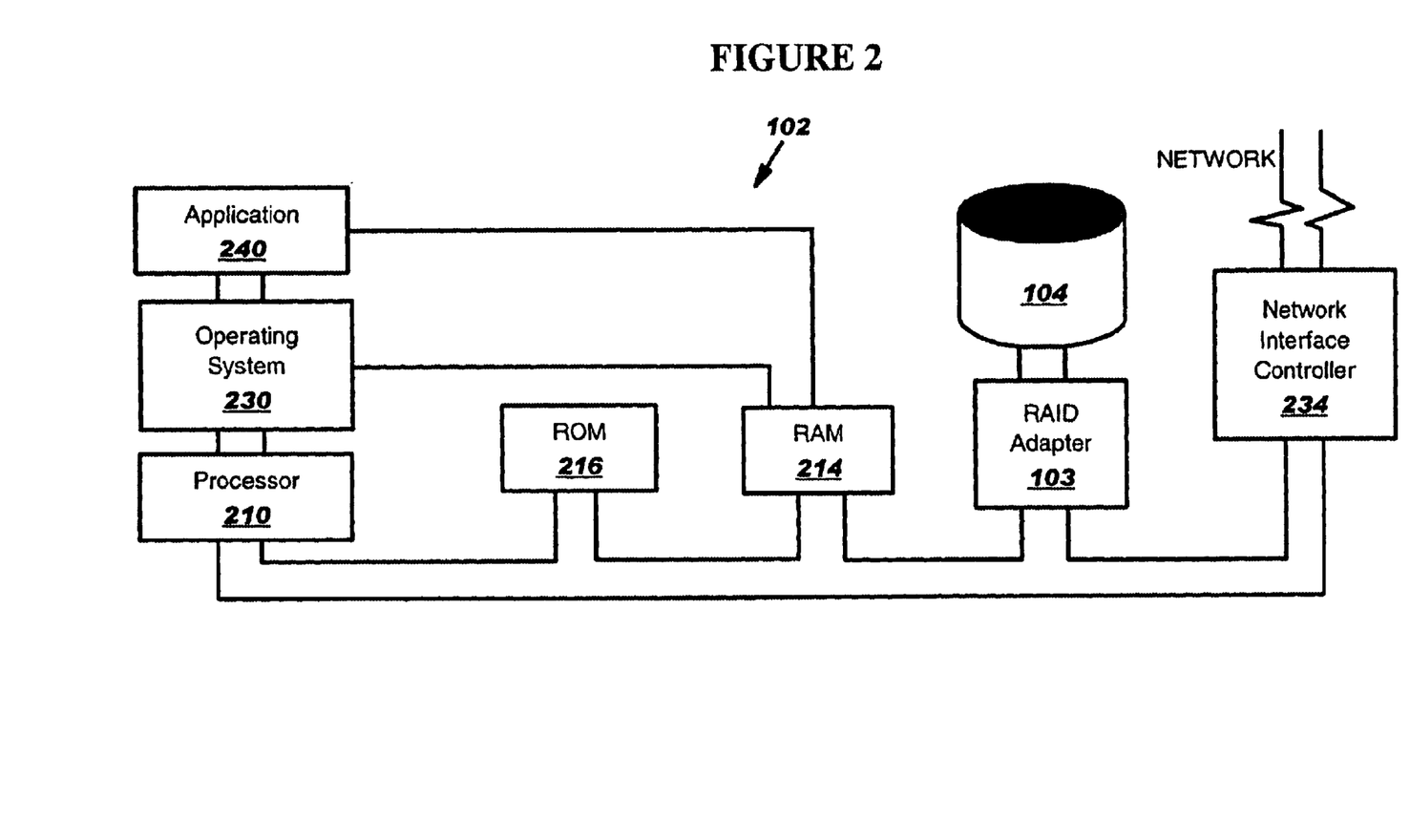
FIG. 2 illustrates an embodiment of the present invention of a server.

FIG. 2—Server

FIG. 2 illustrates an embodiment of the present invention of server 102. Server 102 may comprise a processor 210 coupled to various other components by system bus 212. An operating system 230 may run on processor 210 and provide control and coordinate the functions of the various components of FIG. 2. An application 240 in accordance with the principles of the present invention may run in conjunction with operating system 230 and provide calls to operating system 230 where the calls implement the various functions or services to be performed by application 240. Application 240 may include for example, a program for servicing the workload requests by selecting either a software RAID or a hardware RAID to service all or part of the workload requests as described in conjunction with the description of FIG. 4; a program, commonly referred to as software RAID, used to implement the various RAID control functions; a monitoring program configured to monitor the utilization of processor 210.

Referring to FIG. 2, read only memory (ROM) 216 may be coupled to system bus 212 and include a basic input/output system ("BIOS") that controls certain basic functions of server 102. Random access memory (RAM) 214, RAID adapter 103 and network interface controller 234 may also be coupled to system bus 212. It should be noted that software components including operating system 230 and application 240 may be loaded into RAM 214 which is the computer system's main memory. RAID adapter 103 may be coupled to RAID 104 as illustrated in FIG. 1. It is noted that the program of the present invention that services the workload requests by selecting either a software RAID or a hardware RAID to service all or part of the workload requests as described in conjunction with the description of FIG. 4 may reside in application 240. It is further noted that the program, commonly referred to as software RAID, used to implement the various RAID control functions may reside in application 240. It is further noted that a monitoring program configured to monitor the utilization of processor 210 may reside in application 240. Network Interface controller 234 may interconnect bus 212 with an outside network enabling server 102 to communicate with clients 101 or RAID adapters 103 via a Local Area Network (LAN), e.g., Ethernet, Token Ring, ARCnet, or a Wide Area Network (WAN), e.g., Internet.

Implementations of the invention include implementations as a computer system programmed to execute the method or methods described herein, and as a computer program product. According to the computer system implementations, sets of instructions for executing the method or methods are resident in the random access memory 214 of one or more computer systems configured generally as described above. Until required by server 102, the set of instructions may be stored as a computer program product in another computer memory. Furthermore, the computer program product may be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 3:
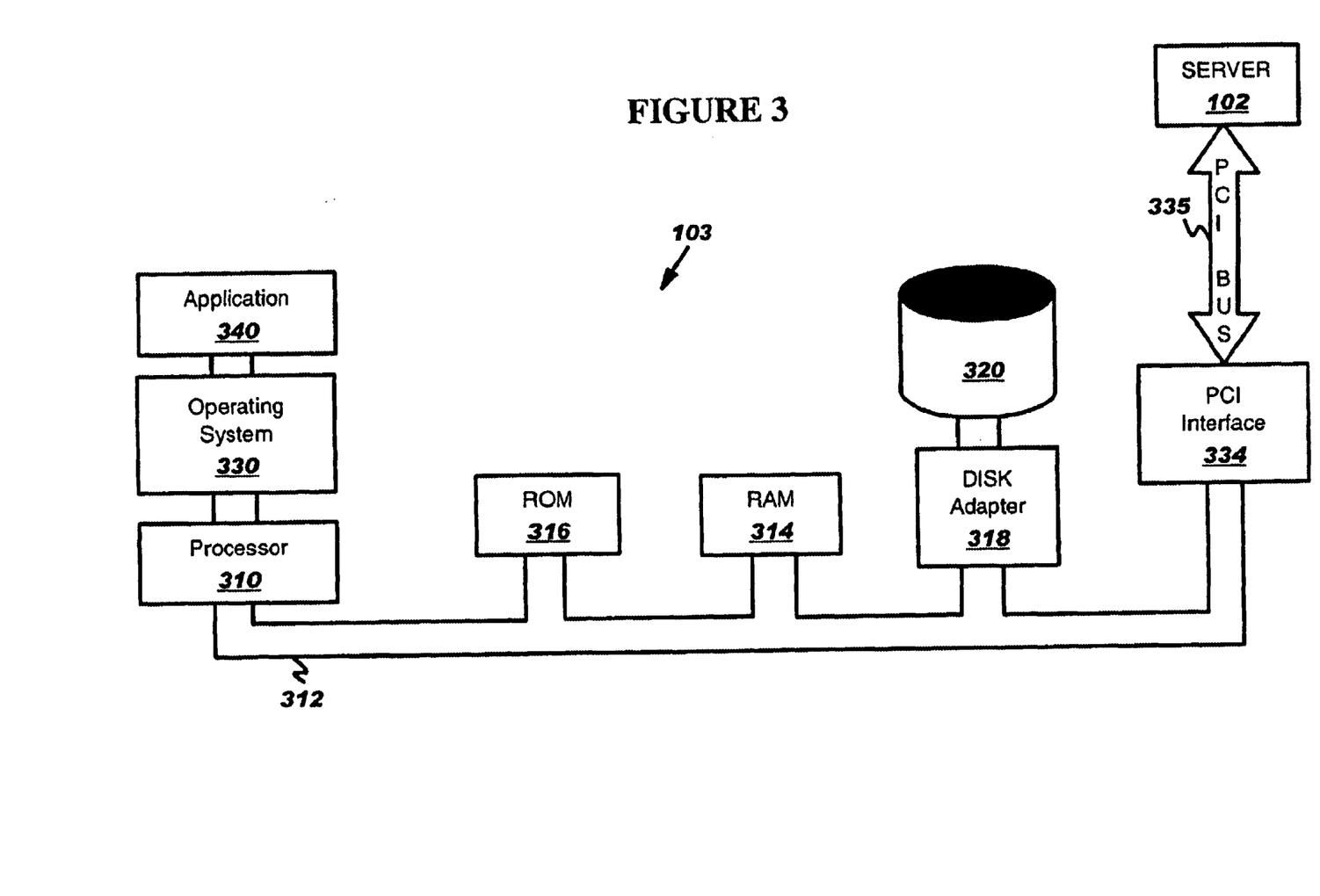
FIG. 3 illustrates an embodiment of the present invention of a RAID adapter.

FIG. 3—RAID Adapter

FIG. 3 illustrates an embodiment of the present invention of RAID adapter 103. RAID adapter 103 may comprise a processor 310 coupled to various other components by system bus 312. An operating system 330 may run on processor 310 and provide control and coordinate the functions of the various components of FIG. 3. An application 340 in accordance with the principles of the present invention may run in conjunction with operating system 330 and provide calls to operating system 330 where the calls implement the various functions or services to be performed by application 340. An application 340 may include, for example, a monitoring program configured to monitor the performance of processor 310 such as the number of instructions executed per unit of time; a program for implementing the various RAID control functions.

Referring to FIG. 3, read only memory (ROM) 316 may be coupled to system bus 312 and include a basic input/output system ("BIOS") that controls certain basic functions of RAID adapter 103. Random access memory (RAM) 314, disk adapter 318 and PCI Interface 334 may also be coupled to system bus 312. It should be noted that software components including operating system 330 and application 340 may be loaded into RAM 314 which is the computer system's main memory. Disk adapter 318 may be a small computer system interface ("SCSI") adapter that communicates with disk unit 320, e.g., disk drive. It is noted that the program used to implement the various RAID control functions may reside in application 340 or in disk unit 320. It is further noted that a monitoring program configured to monitor the utilization of processor 310 may reside in application 340 or in disk unit 320. Peripheral Component Interconnect (PCI) Interface 334 may interconnect bus 312 to server 102 via a PCI bus 335. It is noted that those of ordinary skill in the art would appreciate that the hardware and bus architectures presented in FIG. 3 may vary depending on implementation and that the above description of hardware and bus architectures is illustrative.

Implementations of the invention include implementations as a computer system programmed to execute the method or methods described herein, and as a computer program product. According to the computer system implementations, sets of instructions for executing the method or methods are resident in the random access memory 314 of one or more computer systems configured generally as described above. Until required by RAID adapter 103, the set of instructions may be stored as a computer program product in another computer memory, for example, in disk drive 320 (which may include a removable memory such as an optical disk or floppy disk for eventual use in disk drive 320). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 4:
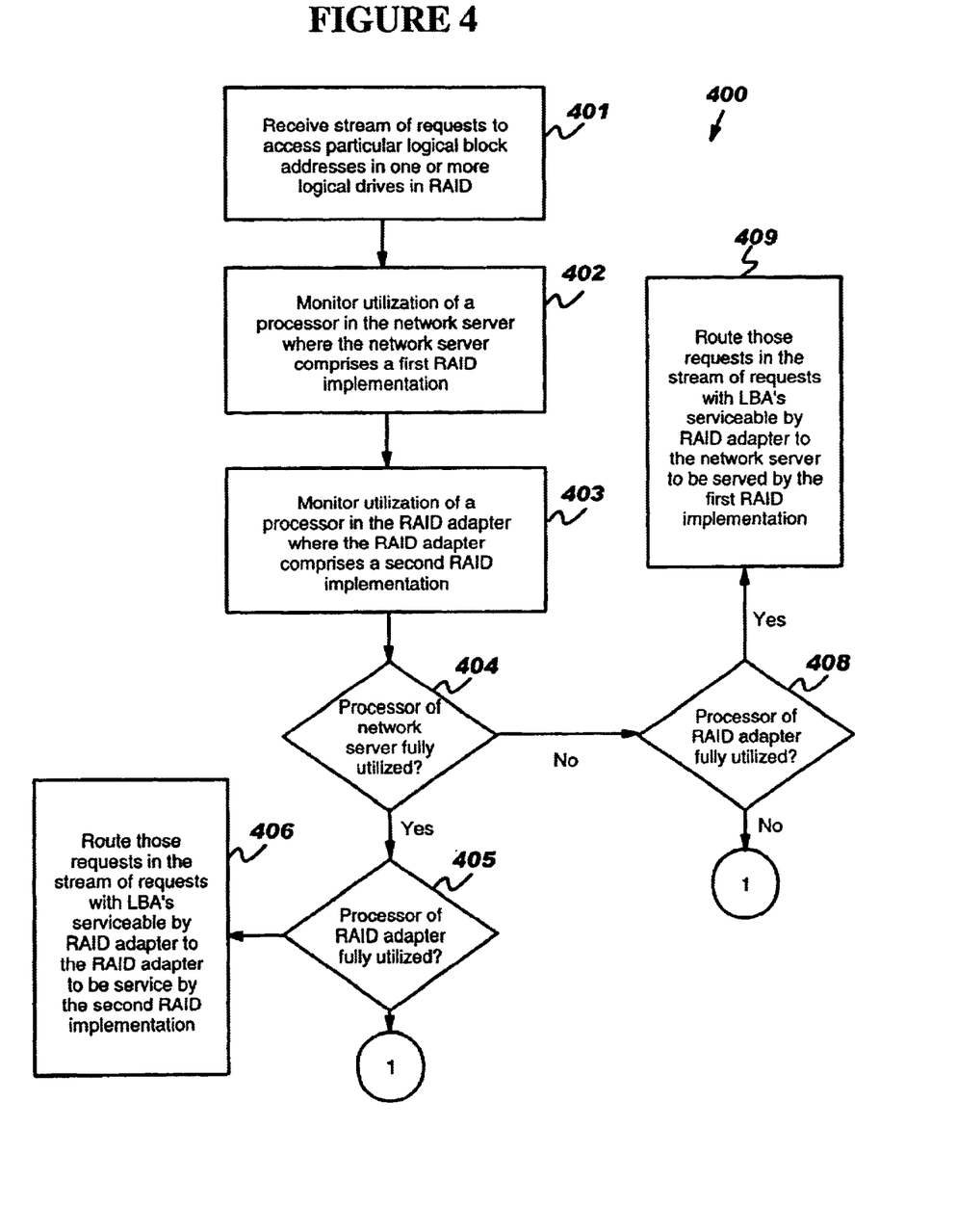
FIG. 4 is a flowchart of a method for an integrated RAID system implementing either a software RAID or a hardware RAID based on which implementation is more desirable to service all or part of the workload requests.

FIG. 4—Method for Servicing Workload Requests by Selecting Either a Software RAID or a Hardware RAID to Service All or Part of the Workload Requests FIG. 4 is a flowchart of one embodiment of the present invention of a method 400 for servicing workload requests by selecting either a software RAID or a hardware RAID to service all or part of the workload requests. As stated in the Background Information section, one type of RAID implementation is commonly referred to as "software RAID." Software RAID may refer to the implementation where software in the network server, which may be part of the operating system on a network server, may be used to implement the various RAID control functions. Another type of RAID implementation is commonly referred to as "hardware RAID." Hardware RAID may refer to the implementation where an application configured to implement the various RAID control functions may be loaded into Random Access Memory (RAM) in a RAID adapter. In certain environments, hardware RAID has been perceived to be advantageous over software RAID; while in other environments, software RAID has been perceived to be advantageous over hardware RAID. It would therefore be desirable to develop an integrated RAID system that comprises a software RAID and a hardware RAID where the integrated RAID system may select implementing either a software RAID or a hardware RAID based on which implementation is more desirable to service all or part of the workload requests. By developing an integrated RAID system, load balancing between the processor in the network server and in the RAID adapter may be accomplished thereby eliminating the bottleneck phenomena in the hardware RAID implementation. That is, the processor in the network server and in the RAID adapter may process the workload requests at a substantially similar rate thereby eliminating the bottleneck phenomena in the hardware RAID implementation. Furthermore, because load balancing may be accomplished between the network server and in the RAID adapter, there may be improved scalability. That is, an increase in the workload requests to be processed by the hardware RAID in the RAID adapter may be accomplished without necessarily replacing the RAID adapter with a RAID adapter that has a faster execution speed. Method 400 is a method for servicing workload requests by selecting either a software RAID or a hardware RAID to service all or part of the workload requests.

In step 401, server 102 (FIG. 2) may receive a stream of requests to read from or write to particular Logical Block Addresses (LBA's) in one or more logical drives 105 (FIG. 1) in RAID 104 (FIG. 1) from one or more clients 101 (FIG. 1). These request may form what is commonly referred to as a "workload" for server 102. That is, a workload may refer to the requests that need to be serviced by server 102.

In step 402, the utilization of processor 210, i.e., the percentage of processor cycles utilized to process instructions, may be monitored in server 102. In one embodiment, a monitoring program configured to monitor the utilization of processor 210 may reside in application 240 (FIG. 2).

In step 403, the utilization of processor 310, i.e., the percentage of processor cycles utilized to process instructions, may be monitored in RAID adapter 103. In one embodiment, a monitoring program may reside in disk unit 320 (FIG. 3) or in application 340 (FIG. 3) configured to monitor the utilization of processor 310. It is noted that the utilization of processor 310 may be monitored in each RAID adapter 103 coupled to server 102 independently of one another. It is further noted that even though the following may discuss particular steps of method 400 in conjunction with a particular RAID adapter 103 that the discussion is applicable to each RAID adapter 103 coupled to server 102.

In step 404, a determination may be made as to whether processor 210 of server 102 is fully utilized, i.e., operating at one hundred percent (100%) utilization. If processor 210 of server 102 is fully utilized, i.e., operating at one hundred percent (100%) utilization, then a determination may be made as to whether processor 310 of RAID adapter 103 is fully utilized, i.e., operating at one hundred percent (100%) utilization, in step 405. It is noted that a determination may be made as to whether processor 310 in each RAID adapter 103 coupled to server 102 is fully utilized, i.e., operating at one hundred percent (100%) utilization in step 405.

If processor 310 of RAID adapter 103 is not fully utilized, i.e., not operating at one hundred percent (100%) utilization, then those requests in the received stream of requests with logical block addresses that are serviceable by RAID adapter 103 may be routed to that RAID adapter 103 to be serviced by hardware RAID 332 (FIG. 3) in step 406. As stated above, each logical drive 105 may be configured to store information, e.g., instructions, data, within a range of LBA's. Furthermore, each RAID adapter 103 may be coupled to one or more logical drives 105. For example, referring to FIG. 1, RAID adapter 103A may be coupled to logical drives 105A–D. RAID adapter 103B may be coupled to logical drives 105E–H. Consequently, RAID adapter 103A may be associated with a range of LBA's that covers the range of LBA's for logical drives 105A–D. That is, RAID adapter 103A may be configured to service the range of LBA's that covers the range of LBA's for logical drives 105A–D. Similarly, RAID adapter 103B may be associated with a range of LBA's that covers the range of LBA's for logical drives 105E–H. That is, RAID adapter 103B may be configured to service the range of LBA's that covers the range of LBA's for logical drives 105E–H. Hence, those requests in the stream of requests received in step 401 with logical block addresses that are serviceable by RAID adapter 103 may be routed to that RAID adapter 103 in step 406.

As stated above, if processor 310 of RAID adapter 103 is not fully utilized, i.e., not operating at one hundred percent (100%) utilization, then those requests in the received stream of requests with logical block addresses that are serviceable by RAID adapter 103 may be routed to that RAID adapter 103 to be serviced by the hardware RAID in RAID adapter 103 in step 406. Those requests with logical block addresses that are serviceable by RAID adapter 103 may be routed to that RAID adapter 103 to be serviced by the hardware RAID since processor 310 of that RAID adapter 103 has the capacity to execute various RAID control functions and processor 210 of server 102 does not have the capacity to execute the various RAID control functions.

Referring to step 405, if processor 310 of RAID adapter 103 is fully utilized, i.e., operating at one hundred percent (100%) utilization, then, in step 407, a first portion of the received stream of requests with LBA's that are serviceable by RAID adapter 103 may be routed to server 102 to be serviced by the software RAID and a second portion of the received stream of requests with LBA's that are serviceable by RAID adapter 103 may be routed to that RAID adapter 103 to be serviced by the software RAID in that RAID adapter 103. These requests may be serviced by the software RAID and the hardware RAID upon the respective processors, processor 210, processor 310, having the capacity to execute the RAID control functions. The first and second portions may be determined based on a ratio of the execution speeds of processor 210 and processor 310 as discussed below.

For example, the portion of the requests to be routed to server 102 to be serviced by the software RAID in server 102 may be determined by the following formula:

$$R_{server} = MIPS_{serer}/(MIPS_{serer} + MIPS_{adapter})$$

where $R_{server}$ may refer to the fraction of the requests received with LBA's that are serviceable by RAID adapter 103 that are to be routed to server 102 to be serviced by the software RAID; where $MIPS_{serer}$ may refer to the execution speed of processor 210, i.e., the Millions Instructions Per Second (MIPS) rating for processor 210 of server 102; where $MIPS_{adapter}$ may refer to the execution speed of processor 310, i.e., the MIPS rating for processor 310 of RAID adapter 103 configured to service the LBA's of these requests.

Similarly, the portion of requests to be routed to RAID adapter 103 to be serviced by the hardware RAID may be determined by the following formula:

$$R_{adapter} = MIPS_{adapter}/(MIPS_{server} + MIPS_{adapter})$$

where $R_{adapter}$ may refer the fraction of the requests received with LBA's that are serviceable by RAID adapter 103 that are to be routed to the hardware RAID in RAID adapter 103; where $MIPS_{serer}$ may refer to the execution speed of processor 210, i.e., the MIPS rating for processor 210 of server 102; where $MIPS_{adapter}$ may refer to execution speed of processor 310, i.e., the MIPS rating for processor 310 of RAID adapter 103 configured to service the LBA's of these requests.

If the MIPS rating for processor 210 of server 102 is 40 MIPS and the MIPS rating for processor 310 of RAID adapter 103 is 20 MIPS, then two-thirds (⅔) of the requests received with LBA's that are serviceable by RAID adapter 103 may be routed to server 102 to be serviced by the software RAID. One-third (⅓)) of the requests received with LBA's that may be serviced by RAID adapter 103 may subsequently be routed to RAID adapter to be serviced by the hardware RAID.

Returning to step 404, if processor 210 of server 102 is not fully utilized, i.e., operating at one hundred percent (100%) utilization, then a determination may be made as to whether processor 310 of RAID adapter 103 is fully utilized, i.e., operating at one hundred percent (100%) utilization, in step 408. It is noted that a determination may be made as to whether processor 310 in each RAID adapter 103 coupled to server 102 is fully utilized, i.e., operating at one hundred percent (100%) utilization in step 408.

If processor 310 of RAID adapter 103 is fully utilized, i.e., operating at one hundred percent (100%) utilization, then those requests in the received stream of requests with logical block addresses that are serviceable by RAID adapter 103 may be routed to server 102 to be serviced by the software RAID in step 409. Those requests with logical block addresses that are serviceable by RAID adapter 103 may be routed to the software RAID in server 102 since processor 210 of server 102 has the capacity to execute various RAID control functions and processor 310 of RAID adapter 103 does not have the capacity to execute various RAID control functions.

If processor 310 of RAID adapter 103 is not fully utilized, i.e., not operating at one hundred percent (100%) utilization, then, in step 407, a first portion of the received stream of requests with LBA's that are serviceable by RAID adapter 103 may be routed to server 102 to be serviced by the software RAID and a second portion of the received stream of requests with LBA's that are serviceable by RAID adapter 103 may be routed to RAID adapter 103 to be serviced by the hardware RAID. The first and second portions may be determined based on a ratio of the execution speeds of processor 210 and processor 310 as described above.

It is noted that method 400 may be executed in a different order presented and that the order presented in the discussion of FIG. 4 is illustrative. It is further noted that certain steps, e.g., steps 404–409, may be executed almost concurrently. It is further noted that steps 401 and 404–409 may be implemented by a program in server 102 residing in application 240. It is further noted that step 402 may be implemented by a monitoring program in server 102 residing in application 240. It is further noted that step 403 may be implemented by a monitoring program residing in RAID adapter 103 in disk unit 320 or in application 340.

Although the system, computer program product and method are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for servicing requests comprising the steps of:

receiving a stream of requests to access one or more logical block addresses in one or more disks in a Redundant Array of Independent Disks (RAID);

monitoring a utilization of a first processor in a network server configured to receive said stream of requests, wherein said network server comprises a first RAID implementation;

monitoring a utilization of a second processor in an adapter coupled to said RAID, wherein said adapter comprises a second RAID implementation; and routing requests in said stream of requests that are serviceable by said adapter to one or more of said first RAID implementation in said network server and said second RAID implementation in said adapter to service said requests that are serviceable by said adapter based on a value of an execution speed of said first processor in said network server and a value of an execution speed of said second processor in said adapter; wherein said first RAID implementation is a software RAID, wherein said second RAID implementation is a hardware RAID.

2. The method as recited in claim 1 further comprising the step of:

determining if said first processor in said network server is fully utilized.

3. The method as recited in claim 2, wherein if said first processor is fully utilized then the method further comprises the step of:

determining if said second processor in said adapter is fully utilized.

4. The method as recited in claim 3, wherein if said second processor is not fully utilized then the method further comprises the step of:

routing said requests that are serviceable by said adapter to said adapter to be serviced by said second RAID implementation.

5. The method as recited in claim 3, wherein if said second processor is fully utilized then the method further comprises the step of:

routing a first portion of said requests that are serviceable by said adapter to said network server to be serviced by said first RAID implementation and a second portion of said requests that are serviceable by said adapter to said adapter to be serviced by said second RAID implementation based on a ratio of said value of said execution speed of said first processor in said network server and said value of said execution speed of said second processor in said adapter.

6. The method as recited in claim 2, wherein if said first processor is not fully utilized then the method further comprises the step of:

determining if said second processor in said adapter is fully utilized.

7. The method as recited in claim 6, wherein if said second processor is fully utilized then the method further comprises the step of:

routing of said requests that are serviceable by said adapter to said network server to be serviced by said first RAID implementation.

8. The method as recited in claim 6, wherein if said second processor is not fully utilized then the method further comprises the step of:

routing a first portion of said requests that are serviceable by said adapter to said network server to be serviced by said first RAID implementation and a second portion of said requests that are serviceable by said adapter to said adapter to be serviced by said second RAID implementation based on a ratio of said value of said execution speed of said first processor in said network server and said value of said execution speed of said second processor in said adapter.

9. A computer program product embodied in a machine readable medium for servicing requests comprising the programming steps of:

receiving a stream of requests to access one or more logical block addresses in one or more disks in a Redundant Array of Independent Disks (RAID);

monitoring a utilization of a first processor in a network server configured to receive said stream of requests, wherein said network server comprises a first RAID implementation;

monitoring a utilization of a second processor in an adapter coupled to said RAID, wherein said adapter comprises a second RAID implementation; and routing requests in said stream of requests that are serviceable by said adapter to one or more of said first RAID implementation in said network server and said second RAID implementation in said adapter to service said requests that are serviceable by said adapter based on a value of an execution speed of said first processor in said network server and a value of an execution speed of said second processor in said adapter; wherein said first RAID implementation is a software RAID, wherein said second RAID implementation is a hardware RAID.

10. The computer program product as recited in claim 9 further comprises the programming step of:

determining if said first processor in said network server is fully utilized.

11. The computer program product as recited in claim 10, wherein if said first processor is fully utilized then the computer program product further comprises the programming step of:

determining if said second processor in said adapter is fully utilized.

12. The computer program product as recited in claim 11, wherein if said second processor is not fully utilized then the computer program product further comprises the step of:

routing said requests that are serviceable by said adapter to said adapter to be serviced by said second RAID implementation.

13. The computer program product as recited in claim 11, wherein if said second processor is fully utilized then the computer program product further comprises the programming step of:

routing a first portion of said requests that are serviceable by said adapter to said network server to be serviced by said first RAID implementation and a second portion of said requests that are serviceable by said adapter to said adapter to be serviced by said second RAID implementation based on a ratio of said value of said execution speed of said first processor in said network server and said value of said execution speed of said second processor in said adapter.

14. The computer program product as recited in claim 10, wherein if said first processor is not fully utilized then the computer program product further comprises the programming step of:

determining if said second processor in said adapter is fully utilized.

15. The computer program product as recited in claim 14, wherein if said second processor is fully utilized then the computer program product further comprises the programming step of:

routing of said requests that are serviceable by said adapter to said network server to be serviced by said first RAID implementation.

16. The computer program product as recited in claim 14, wherein if said second processor is not fully utilized then the computer program product further comprises the programming step of:

routing a first portion of said requests that are serviceable by said adapter to said network server to be serviced by said first RAID implementation and a second portion of said requests that are serviceable by said adapter to said adapter to be serviced by said second RAID implementation based on a ratio of said value of said execution speed of said first processor in said network server and said value of said execution speed of said second processor in said adapter.

17. A system, comprising:

a network server configured to receive a stream of requests to access one or more logical block addresses in one or more disks in a Redundant Array of Independent Disks (RAID); and an adapter coupled to said network server and to said RAID, wherein said adapter comprises:
 a second processor; and
 a non-volatile memory unit coupled to said second processor, wherein said non-volatile memory unit is operable for storing a second RAID implementation, wherein said second RAID implementation is a hardware RAID configured to implement RAID control functions;

wherein said network server comprises:
 a memory unit operable for storing a computer program operable for servicing requests, wherein said memory unit is further operable for storing a first RAID implementation configured to implement RAID control functions; and
 a first processor coupled to said memory unit, wherein said first processor, responsive to said computer program, comprises:
  circuitry operable for receiving a stream of requests to access one or more logical block addresses in one or more disks in a Redundant Array of Independent Disks (RAID);
  circuitry operable for monitoring a utilization of a first processor in a network server configured to receive said stream of requests, wherein said network server comprises a first RAID implementation; wherein said first RAID implementation is a software RAID.
  circuitry operable for monitoring a utilization of a second processor in said adapter coupled to said RAID, wherein said adapter comprises a second RAID implementation; and
  circuitry operable for routing requests in said stream of requests that are serviceable by said adapter to one or more of said first RAID implementation in said network server and said second RAID implementation in said adapter to service said requests that are serviceable by said adapter based on a value of an execution speed of said first processor in said network server and a value of an execution speed of said second processor in said adapter.

18. The system as recited in claim 17, wherein said first processor further comprises:

circuitry operable for determining if said first processor in said network server is fully utilized.

19. The system as recited in claim 18, wherein if said first processor is fully utilized then said first processor further comprises:

circuitry operable for determining if said second processor in said adapter is fully utilized.

20. The system as recited in claim 19, wherein if said second processor is not fully utilized then said first processor further comprises:

circuitry operable for routing said requests that are serviceable by said adapter to said adapter to be serviced by said second RAID implementation.

21. The system as recited in claim 19, wherein if said second processor is fully utilized then said first processor further comprises:

circuitry operable for routing a first portion of said requests that are serviceable by said adapter to said network server to be serviced by said first RAID implementation and a second portion of said requests that are serviceable by said adapter to said adapter to be serviced by said second RAID implementation based on a ratio of said value of said execution speed of said first processor in said network server and said value of said execution speed of said second processor in said adapter.

22. The system as recited in claim 18, wherein if said first processor is not fully utilized then said first processor further comprises:

circuitry operable for determining if said second processor in said adapter is fully utilized.

23. The system as recited in claim 22, wherein if said second processor is fully utilized then said first processor further comprises:

circuitry operable for routing of said requests that are serviceable by said adapter to said network server to be serviced by said first RAID implementation.

24. The system as recited in claim 22, wherein if said second processor is not fully utilized then said first processor further comprises:

circuitry operable for routing a first portion of said requests that are serviceable by said adapter to said network server to be serviced by said first RAID implementation and a second portion of said requests that are serviceable by said adapter to said adapter to be serviced by said second RAID implementation based on a ratio of said value of said execution speed of said first processor in said network server and said value of said execution speed of said second processor in said adapter.

25. A system, comprising:

a network server configured to receive a stream of requests to access one or more logical block addresses in one or more disks in a Redundant Array of Independent Disks (RAID), wherein said network server comprises a first RAID implementation; and an adapter coupled to said network server and to said RAID, wherein said adapter comprises a second RAID implementation; wherein said first RAID implementation is a software RAID, wherein said second RAID implementation is a hardware RAID.

* * * * *